US011811814B2

(12) United States Patent
Mauro et al.

(10) Patent No.: US 11,811,814 B2
(45) Date of Patent: Nov. 7, 2023

(54) METHOD AND SYSTEM FOR SECURITY ASSESSMENT OF IOT DEVICES

(71) Applicant: NSR S.r.l., Rome (IT)

(72) Inventors: Antonio Mauro, Rome (IT); Gerardo Costabile, Rome (IT)

(73) Assignee: NSR S.r.l., Rome (IT)

( * ) Notice: Subject to any disclaimer, the term of this patent is extended or adjusted under 35 U.S.C. 154(b) by 385 days.

(21) Appl. No.: 17/231,568

(22) Filed: Apr. 15, 2021

(65) Prior Publication Data

US 2021/0329024 A1 Oct. 21, 2021

Related U.S. Application Data

(60) Provisional application No. 63/011,511, filed on Apr. 17, 2020.

(30) Foreign Application Priority Data

Apr. 17, 2020 (IT) .......................... 102020000008155

(51) Int. Cl.
*H04L 9/40* (2022.01)
*G16Y 30/10* (2020.01)

(52) U.S. Cl.
CPC .......... *H04L 63/1433* (2013.01); *G16Y 30/10* (2020.01)

(58) Field of Classification Search
CPC . H04L 63/1433; H04L 63/1425; G16Y 30/10; G06F 2212/175; G06F 21/577
See application file for complete search history.

(56) References Cited

U.S. PATENT DOCUMENTS

| 10,992,338 | B1 * | 4/2021 | Priyantha | H04W 16/14 |
| 2015/0033340 | A1 * | 1/2015 | Giokas | H04L 63/1433 726/23 |
| 2015/0242619 | A1 * | 8/2015 | Bender | H04L 63/10 726/22 |
| 2018/0091543 | A1 * | 3/2018 | Czarny | H05K 999/99 |
| 2018/0124095 | A1 * | 5/2018 | Hamdi | G06F 7/24 |

(Continued)

FOREIGN PATENT DOCUMENTS

| CN | 114969762 A | * | 8/2022 |
| CN | 115118525 A | * | 9/2022 |

(Continued)

*Primary Examiner* — Sarah Su
(74) *Attorney, Agent, or Firm* — Dickinson Wright PLLC; Andrew D. Dorisio

(57) ABSTRACT

A system (100) for security assessment of a plurality of IoT devices (210, 220, 230, 240) includes a programmed processing unit (110) adapted to carry out a vulnerability and/or "penetration test" method; according to this method, at least wireless communication medium and at least one communication protocol are determined to be used for the assessment, then at least one scan tool is selected based on the communication medium and communication protocol, then the scan tool is executed on the IoT devices (210, 220, 230, 240), and then data from the scan tool are collected, the data being obtained from reaction of the IoT devices to the scan tool; the computerized system performs a scan of a predetermined frequency bandwidth in order to identify the IoT devices to be assessed and the communication protocol to be used for the assessment.

18 Claims, 1 Drawing Sheet

(56) References Cited

U.S. PATENT DOCUMENTS

| | | | | |
|---|---|---|---|---|
| 2018/0144139 A1* | 5/2018 | Cheng | ............... | H04L 63/1433 |
| 2019/0098028 A1* | 3/2019 | Ektare | ............... | H04L 41/0893 |
| 2020/0389483 A1* | 12/2020 | Dye | ............... | H05K 999/99 |
| 2021/0006583 A1* | 1/2021 | Ryabenkiy | ............... | H04L 63/1425 |
| 2021/0029153 A1* | 1/2021 | Sugimoto | ............... | H04L 63/1441 |

FOREIGN PATENT DOCUMENTS

| | | | | |
|---|---|---|---|---|
| KR | 102454948 B1 * | 10/2022 | ............ | G06F 21/57 |
| WO | WO-2020219157 A1 * | 10/2020 | ............ | G06F 21/577 |

\* cited by examiner

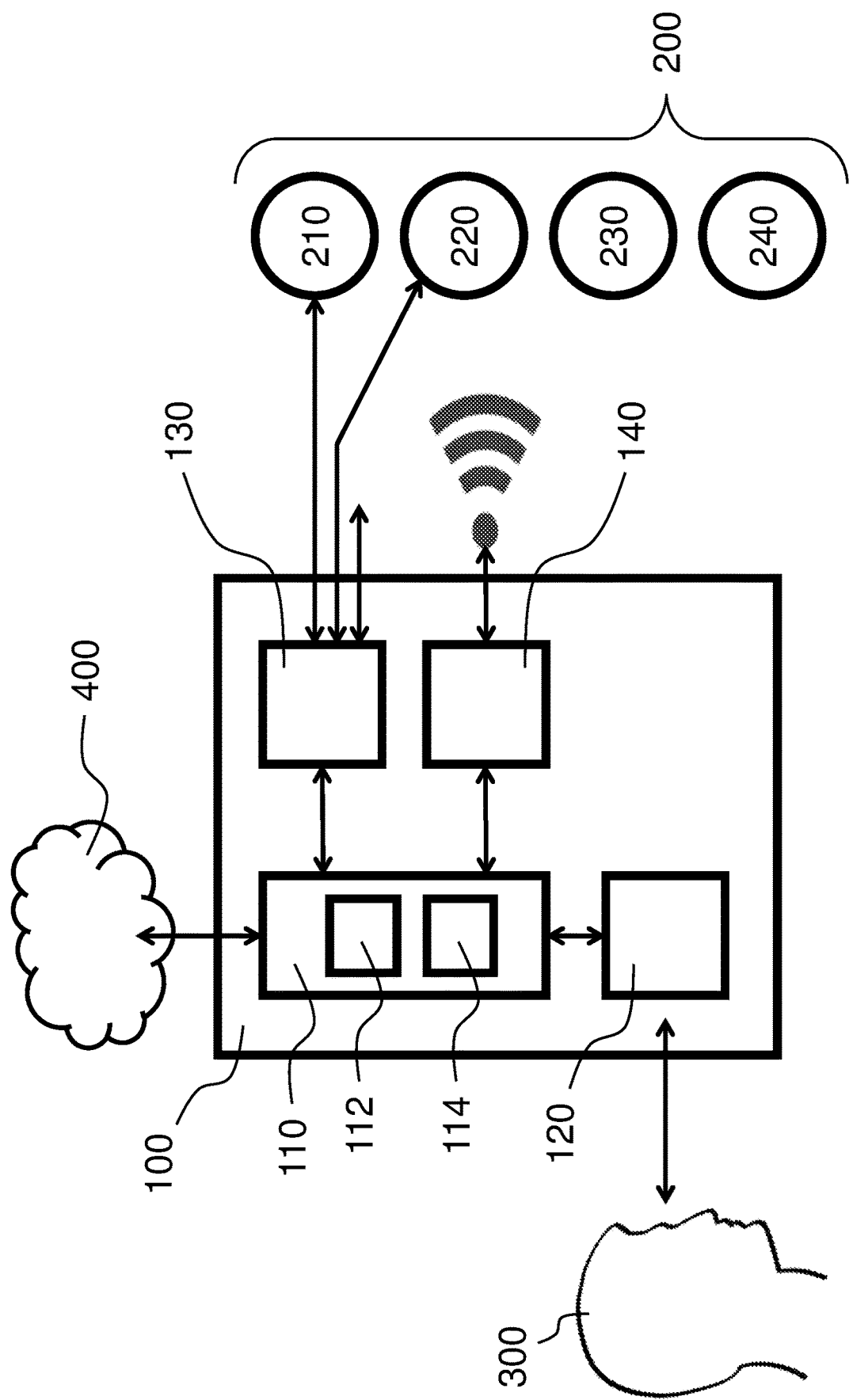

METHOD AND SYSTEM FOR SECURITY ASSESSMENT OF IOT DEVICES

TECHNICAL FIELD

This disclosure relates to a method and a system for security assessment of IoT devices, in particular for vulnerability assessment and/or "penetration test".

BACKGROUND ART

IoT is becoming very popular in any field of technology. As known, IoT (=Internet of Things) is a system of interrelated entities associated with unique identifiers and having the ability to process and transfer data over a network without requiring human-to-human or human-to-computer interaction.

In the present patent application, the word "device" is used to mean any of entity of the system irrespective of its complexity, its ability to deal with data, its nature (for example a computing machine, a mechanical machine, an optical machine, a component of a machine, etc.) and its application.

This disclosure considers in particular but not only the so-called Operational Technology sector which refers to computing systems that are used to manage industrial operations.

ICS (=Industrial Control Systems) is a major segment within the Operational Technology sector, and comprises systems that are used to monitor and control industrial processes.

Industrial Control Systems are often managed via a Supervisory Control and Data Acquisition (SCADA) system that provides for example a graphical user interface for operators to easily observe the status of a system, receive any alarms indicating out-of-band operation, or to enter system adjustments to manage the process under control.

IoT devices are becoming increasingly popular also in the Operational Technology sector.

IoT devices, like any electronic device able to communicate electronically with the outside environment, are vulnerable to cyber-attacks.

In the past, computer systems and ICS/SCDA systems worked separately and cyber risk was low because they were not connected.

At the moment, the situation has changed as the trend is to connect all systems through computer network connection, in particular through the Internet that is a public network which can pose higher risk. In such new situation, cyber risk is much increased. Furthermore, "old" or "legacy" ICS/SCADA systems were not designed to be so connected and, especially, were not designed to resist to cyber-attacks; their vulnerability may derive from firmware and/or operating system and/or application software, and in many/most cases upgrading or patching is not possible.

It is to be noted that the words "vulnerability" and "penetration" have two specific and different meaning in the field of ITC security—reference may be made for example to the official documentation published by NIST (=National Institute of Standards and Technology); in particular, the "penetration test" is the activity aimed at checking whether one or more vulnerabilities (already known in some way or determined just before the test) can lead to a so-called "exploit" or "breach". In 2018, NIST defined a "Framework for Improving Critical Infrastructure Cybersecurity" (see nvlpubs.nist.gov, incorporated herein by reference) that provides for five Framework Core Functions: Identify, Protect, Detect, Respond, Recover.

SUMMARY

Therefore, it would be desirable to have a method and a system suitable for assessing such vulnerability and/or such penetration possibility of IoT devices, in particular for IoT devices of Industrial Control Systems, more in particular of SCADA systems.

It is to be noted that the assessments according to the disclosure fall under the above "Identify" function, i.e. they regard identification of cybersecurity risks before they materialize; in other words, the disclosure cannot be equated to a protection tool or a detection tool or a response tool or a recover tool.

More specifically, it would be desirable to have a single system able to consider various kinds of risks and/or several different types of IoT devices. For example, even a single one of such IoT devices may support wired communication and/or wireless communication, and one or more different communication protocols.

Furthermore, the desired system may be a single tool to be used by a technician when evaluating real operational environments. Such tool should be able to adapt to completely different operational environments.

This is substantially achieved through the method and system having the features set out in the annexed claims that have to be considered an integral part of the present description.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 illustrates a block diagram of an embodiment of a system according to the disclosure.

It is to be noted that the disclosure is not restricted to what is described in the following, but its scope is determined solely by the appended claims; vulnerability assessment and "penetration test" are independent in principle and may be advantageously integrated.

DETAILED DESCRIPTION OF EMBODIMENTS

The following detailed description deals primarily with the vulnerability assessment; but this is not to be construed in a limitative manner as, for the purpose of the disclosure, vulnerability and "penetration tests" are similar as they may be carried out in a similar way (see afterwards). "Penetration test" is dealt with at the end of the following detailed description as an extension of what has been described before.

FIG. 1 illustrates a block diagram of an example of a system 100 according to the disclosure.

In this FIGURE, there is shown a set of IoT devices 200 that for exemplary purposes are four devices labelled 210, 220, 230 and 240; for example, device 210 is adapted for wired communication only (through e.g. a RS 485 cable), device 220 is adapted both for wired communication (through e.g. an Ethernet cable) and wireless communication, devices 230 and 240 are adapted both for wireless communication only. These devices are vulnerable due to their ability of wired and/or wireless communication; a system according to the disclosure may be able to deal with one or both risks, preferably both risks.

In this FIGURE, there is shown an operator 300 that interacts with system 100 in order to perform a vulnerability assessment.

In this FIGURE, there is shown a cloud computing system 400 that communicates with system 100 for example in order to send software upgrade (e.g. vulnerability scan tools) stored and running in system 100.

System 100 includes for example for a programmed processing unit 110, a human-machine interface unit 120 (connected to unit 110), a communication unit 130 for communication with IoT devices through at least one wired communication medium (for example both an Ethernet cable, a RS-485 cable and a RJ45 cable) and a communication unit 140 for communication with IoT devices through at least one wireless communication medium. In this FIGURE, it is highlighted that unit 110 includes a processor 112 and memory 114.

The method for the vulnerability assessment of a set of IoT devices (in general many devices are assessed in a single assessment session) according to the disclosure may be understood from the following considering the system 100 of FIG. 1 as a system example that supports and allows to implement the method thanks to its components.

In general, according to the method:
- (at least) wireless communication medium is selected to be used for the vulnerability assessment and at least one communication protocol is determined to be used for the vulnerability assessment, then at least one vulnerability scan tool is selected based on the selected wireless communication medium and the determined communication protocol, then
- the selected vulnerability scan tool is executed on at least some of the IoT devices, and then
- vulnerability data from the executed vulnerability scan tool are collected and preferably stored in a vulnerability result database.

The computerized system performs a scan of a predetermined frequency bandwidth in order to identify the IoT devices to be vulnerability assessed and at least one communication protocol to be used for the vulnerability assessment.

Execution of a vulnerability scan tool comprises performing an attempt of communication with an IoT device and recording a reaction of the IoT device to the attempt of communication, and vulnerability data (e.g. vulnerability severity level) are obtained from said reaction.

It is to be noted that the security assessment is carried out without installing any software and any hardware on the IoT devices for the purpose of vulnerability assessment. To be precise, no software and hardware is installed on the IoT devices either before (i.e. shortly before) the vulnerability assessment or during the vulnerability assessment; only the reactions of the IoT devices are considered.

It is clear from the above that the same communication medium and/or the same communication protocol and/or the same scan tool may be used for assessing several devices.

It is also clear from the above that a single assessment session may also imply the use of several communication media and/or several communication protocols and/or several scan tools.

Typically, vulnerability data is not only collected but also parsed before being stored in the vulnerability result database.

Vulnerability data, in particular data in the vulnerability result database, may be presented to an operator for example after a vulnerability assessment session has finished and/or even during a vulnerability assessment session.

The communication medium used according to the method is a wireless communication medium.

Additionally, the communication medium used according to the method may also be a wired communication medium, for example an Ethernet cable and/or a RS 485 cable and/or a RS-232 cable and/or RS-422 cable and/or a RJ45 cable and/or RJ48 cable and/or a "digital I/O" connection; this is useful for example when the IoT device (or devices) to be assessed is a component of an Industrial Control System, in particular a SCADA system.

As already anticipated, in a single vulnerability assessment session a plurality of IoT devices may be assessed. For example, an operator may carry a vulnerability assessment system (like e.g. system 100) in a case, enter a work environment (for example a factory or an office) or home environment, and perform vulnerability assessment session on all or many IoT devices within the environment. This would typically exclude computers, for example Desktops and Laptops and Tablets, and phones, for example Smartphones. It is to be noted that, due for example to limited wireless coverage, it may be necessary to have several vulnerability assessment sessions in a single environment.

Typically, the IoT devices to be assessed are different; for example, two or more communication protocols are used for their vulnerability assessment.

Typically, the set of IoT devices to be accessed is identified through a scan of a predetermined frequency bandwidth, in particular, a very wide bandwidth from 1 MHz to 6 GHz. It is to be considered that, according to some embodiments, the bandwidth to be scanned by the vulnerability assessment system, for example, during a vulnerability assessment session, may be set during its configuration by the manufacturer and/or during a setting by a user.

Advantageously, a device identified through the scan is not subject to vulnerability assessment if it is not considered an IoT device according to one or more predetermined criteria; for example, a Desktop, a Laptop, a Tablet and a Smartphone are not considered IoT device. The one or more exclusion criteria may be stored in a vulnerability assessment system during its configuration by the manufacturer and/or during a setting by a user.

Considering wireless communication according to advantageous embodiments, the method may comprise preliminarily performing a scan of a predetermined frequency bandwidth by increasing frequency in successive frequency steps; at every frequency step:

A) a check is performed whether a corresponding frequency is used or may be used by an IoT device, B) if check at step A is positive, a determination is performed of what communication protocol is used by the IoT device on that frequency by interrogating the IoT device (the communication protocol may be known or unknown), and C) a storage in a record of a frequency scan result database is performed of the results of the check at step A and the determination at step B.

The method comprises subsequently:

D) selecting one or more vulnerability scan tools based on information stored in the frequency scan result database, and E) executing the selected vulnerability scan tools on the IoT device, and F) collecting vulnerability data from said one or more vulnerability scan tools and storing the vulnerability data in a vulnerability result database.

It is to be considered that during a frequency scan several IoT devices. In this case, at step E one or more vulnerability tools may be executed on one or more IoT devices. It may be possible to proceed IoT device by IoT device (i.e. completing the vulnerability assessment of a device through all necessary vulnerability tools before starting the vulnerability assessment of another device through all necessary vulnerability tools) or vulnerability tool by vulnerability tool (i.e. completing the vulnerability assessment all devices through a vulnerability tool before starting the vulnerability assessment of all devices through another vulnerability tool).

Typically, at step D, the vulnerability scan tools are selected based on protocol information deriving from step B. For example, the following software tools are available on the market: IoTSeeker, IoTivity, MQTT-PWN, Tancent IoT Hunter, EXPLIoT, ThingsBoard, Attify OS, KillerBee, Air-Crack-ng, Yersinia, BlueMaho, Ubertooth, Cotopaxi, BladeRF 2.0 Micro, HackRF one, Xerosploit, Metasploit Framework.

Preferably, at step E, a vulnerability scan tool is executed for all relevant frequencies based on frequency information deriving from step A before executing another vulnerability scan tool.

After performing a frequency scan, in particular after steps A and B and C, the result may be that a set of frequencies are used by some IoT devices. Depending on the configuration of the vulnerability assessment system used, the system may be able to determine the communication protocol for only some of the frequencies of the set. Therefore, those frequencies used for communicating with a protocol unknown to the system will be marked as such in the frequency scan result database; in this way, afterwards, a vulnerability assessment may be performed manually. Those frequencies used for communicating with a protocol known to the system (for example Wi Fi or BlueTooth or ZigBee or Z Wave or LoRa that are typically used by IoT devices) will be marked with the name or code of the used protocol in the frequency scan result database for future automatic vulnerability assessment through a corresponding vulnerability scan tool.

Advantageously, the scan of a predetermined frequency bandwidth is performed through software defined radio technology.

Preferably, at step B, the IoT device or devices is/are interrogated using one or more communications compatible with the frequency. In fact, only some frequencies (for example one or more narrow frequency bandwidths) are assigned to a communication protocol—see exemplary tables below.

|  | ZigBee | WiFi | BT | BLE | Z-Wave |
|---|---|---|---|---|---|
| Standard | IEEE 802.15.4 | IEEE 802.11 | 802.15.1 | 802.15.1 | Proprietary |
| Modulation | OQPSK, BPSK | QPSK | GFSK, DQPSK, 8DPSK | GFSK | FSK, GFSK |
| Spread Spectrum | Direct-sequence spread spectrum (DSSS) | Direct-sequence spread spectrum (DSSS) | Adaptive Frequency-hopping spread spectrum (AFH) | Adaptive Frequency-hopping spread spectrum (AFH) | Direct sequence spread spectrum (DSSS) |
| Operating Band | 2.4 GHz, 915 MHz and 868 MHz (license-free ISM band) | 2.4 GHz UHF and 5 GHz SHF ISM radio bands | ISM band, 2.4 to 2.485 GHz | ISM band, 2.4 to 2.485 GHz | 915 MHz ISM band and 868 MHz RFID band |

It is to be noted that the method according to the disclosure may be carried out completely automatically and/or partially automatically by guiding an operator depending on the configuration of the vulnerability assessment system. As a first example, if a system provides for assessment of wired communication (or wired and wireless communication), it is likely that the operator will have to manually connect several IoT devices, one after the other, and the operator will be prompted to do so. As a second example, if a system a system provides for assessment of wireless communication and is designed or requested to be used in a wide environment, it is likely that a set of vulnerability assessment sessions are necessary, one after the other in different places of the environment, and operator will be prompted to do so, i.e. to start a new session.

It is worth remembering some of the protocols used for wired communication in ICS/SCDA systems: ModBus, S7, MQTT, DNP3, IEC60870-5-104, IEC61850-GOOSE, IEC61850-GSSE, IEC61850-MMS, IEC61850-SMV, Open-Protocol.

What has been described so far regarding the "vulnerability assessment" applies also to the "penetration test".

For example, according to some embodiments of the disclosure, a method for "penetration test" of a plurality of IoT devices through a computerized system is carried out without installing any software and any hardware on the IoT devices for the purpose of "penetration test", and the computerized system performs the following steps:

at least wireless communication medium is selected to be used for the "penetration test" and at least one communication protocol is determined to be used for the "penetration test", then at least one "penetration" scan tool is selected based on the selected wireless communication medium and the determined at least one communication protocol, then the selected at least one "penetration" scan tool is executed on at least some of the one IoT devices, and then "penetration" data from the executed at least one "penetration" scan tool are collected and preferably stored in a "penetration" result database.

The computerized system performs a scan of a predetermined frequency bandwidth in order to identify IoT devices to be "penetration" tested and at least one communication protocol to be used for the "penetration test.

Execution of a "penetration" scan tool comprises performing an attempt of introducing a piece of information into an IoT device and recording a reaction of the IoT device to the attempt of introduction, and "penetration" data (e.g. "penetration" severity level) are obtained from the reaction.

The tool or tools used for "penetration test" may be the same tool or tools used for "vulnerability assessment" or different tool or tools. Considering the list of software tools previously indicated herein, some of them may be better for "vulnerability assessment" and some of them may be better for "penetration test". The "penetration" result database and the "vulnerability" result database may be distinct or may be integrated into a single security database.

Advantageously, a "penetration test" is performed on an IoT device after (e.g. 1-10 seconds) or immediately after (e.g. 0.01-0.1 seconds) that a vulnerability of this IoT device has been found using the results of the vulnerability assessment (advantageously, if no vulnerability is found no penetration test is performed). This may be done for example if a security assessment session comprises both "vulnerability assessment" and "penetration test" based for example a same scan of a predetermined frequency bandwidth in order to identify IoT devices to be assessed/tested and at least one communication protocol to be used for the "vulnerability assessment" and the "penetration test".

According to advantageous "integrated" embodiments of the disclosure, a method for security assessment of a plurality of IoT devices through a computerized system comprises both a vulnerability assessment and a "penetration test" and is carried out without installing any software and any hardware on the IoT devices for the purpose of vulnerability assessment and "penetration test"; the computerized system performs the following steps:

at least wireless communication medium is selected to be used for the assessment/test and at least one communication protocol is determined to be used for the assessment/test, then at least one vulnerability/test scan tool is selected based on the selected wireless communication medium and the determined at least one communication protocol, then the selected at least one vulnerability scan tool and if necessary (i.e. if a vulnerability is found) at least one penetration scan tool are executed on at least some of the one IoT devices, and then vulnerability data and possibly penetration data from the executed at least one scan tool are collected and preferably stored in a security database.

A system according to the disclosure, for example system 100 of FIG. 1, is adapted for security assessment of IoT devices and comprises a programmed processing unit (such as unit 110 in FIG. 1) adapted to carry out the method according the disclosure, i.e. for vulnerability assessment or for "penetration test" or for vulnerability and "penetration test".

Typically, the system comprises further at least one communication unit adapted to communicate with IoT devices through at least one wired communication medium and/or at least one communication unit adapted to communicate with IoT devices through at least one wireless communication medium.

Preferably, the system comprises a software defined radio unit for scanning a predetermined frequency bandwidth and for wireless communicating with IoT devices.

Typically, the system comprises one or more scan tools being preferably implemented as software programs to be executed by the programmed processing unit. It is to be noted that a same scan tool might be used for both vulnerability and "penetration test".

Typically, the system is arranged to scan a predetermined frequency bandwidth, identify a set of IoT devices within its radio coverage and manage the asset (i.e. the set of IoT devices) inventory.

The invention claimed is:

1. A method for security assessment of a plurality of IoT devices through a computerized system, wherein the security assessment comprises a vulnerability assessment and is carried out without installing any software and any hardware on the IoT devices for the purpose of vulnerability assessment, wherein the computerized system performs the following steps:
   at least wireless communication medium is selected to be used for the vulnerability assessment and at least one communication protocol is determined to be used for the vulnerability assessment, then
   at least one vulnerability scan tool is selected based on said selected wireless communication medium and said determined at least one communication protocol, then
   said selected at least one vulnerability scan tool is executed on at least some of the one IoT devices, and then
   vulnerability data from said executed at least one vulnerability scan tool are collected and preferably stored in a vulnerability result database;
   wherein the computerized system performs a scan of a predetermined frequency bandwidth in order to identify IoT devices to be vulnerability assessed and at least one communication protocol to be used for the vulnerability assessment;
   wherein execution of a vulnerability scan tool comprises performing an attempt of communication with an IoT device and recording a reaction of the IoT device to the attempt of communication, and vulnerability data are obtained from said reaction.

2. The method of claim 1, wherein the security assessment comprises a penetration test and is carried out without installing any software and any hardware on the IoT devices for the purpose of penetration test;
   wherein the computerized system performs the following steps:
   at least wireless communication medium is selected to be used for the penetration test and at least one communication protocol is determined to be used for the penetration test, then
   at least one penetration scan tool is selected based on said selected wireless communication medium and said determined at least one communication protocol, then
   said selected at least one penetration scan tool is executed on at least some of the one IoT devices, and then
   penetration data from said executed at least one penetration scan tool are collected and preferably stored in a penetration result database;

wherein the computerized system performs a scan of a predetermined frequency bandwidth in order to identify IoT devices to be penetration tested and at least one communication protocol to be used for the penetration test;

wherein execution of a penetration scan tool comprises performing an attempt of introducing a piece of information into an IoT device and recording a reaction of the IoT device to the attempt of introduction, and penetration data are obtained from said reaction.

3. The method of claim 1, wherein a wired communication medium is also selected to be used for the vulnerability or penetration test, in particular an Ethernet cable or a RS-485 cable or a RS-232 cable or a RS-422 cable or a RJ45 cable or RJ48 cable or a digital I/O connection, and wherein at least one of said IoT devices is a component of an Industrial Control System, in particular a SCADA system.

4. The method of claim 1, wherein two or more IoT devices of said plurality are different, and wherein two or more communication protocols are used for the vulnerability and/or penetration test.

5. The method of claim 1, wherein the IoT devices to be assessed are identified through a scan of a predetermined frequency bandwidth from 1 MHz to 6 GHz.

6. The method of claim 1, wherein a device identified through said scan is not subject to vulnerability and/or penetration test if it is not considered an IoT device according to one or more predetermined criteria.

7. The method of claim 1,
wherein the method comprises preliminarily performing a scan of a predetermined frequency bandwidth by increasing frequency in successive frequency steps, wherein at every frequency step:
A) a check is performed whether a corresponding frequency is used or may be used by said at least one IoT device,
B) if check at step A is positive, a determination is performed of what communication protocol is used by said at least one IoT device on that frequency by interrogating said at least one IoT device, wherein the communication protocol may be known or unknown, and
C) a storage in a record of a frequency scan result database is performed of the results of the check at step A and the determination at step B;
wherein the method comprises subsequently:
D) selecting one or more vulnerability and/or penetration scan tools based on information stored in the frequency scan result database, and
E) executing the selected vulnerability and/or penetration scan tools on said at least one IoT device, and
F) collecting vulnerability and/or penetration data from said one or more vulnerability and/or penetration scan tools and storing the vulnerability and/or penetration data in a vulnerability and/or penetration result database.

8. The method of claim 7, wherein at step D vulnerability and/or penetration scan tools are selected based on protocol information deriving from step B.

9. The method of claim 7, wherein at step E a vulnerability and/or penetration scan tool is executed for all relevant frequencies based on frequency information deriving from step A before executing another vulnerability and/or penetration scan tool.

10. The method of claim 7, wherein said known communication protocol is a protocol selected from the group consisting of Wi Fi or BlueTooth or ZigBee or Z-Wave and LoRa.

11. The method of claim 7, wherein the scan of a predetermined frequency bandwidth is performed through software defined radio technology.

12. The method of claim 7, wherein at step B said at least one IoT device is interrogated using one or more communications compatible with the frequency.

13. The method of claim 7, wherein for unknown communication protocol vulnerability and/or penetration test is performed manually.

14. The method of claim 1, being carried out fully automatically and/or partially automatically by guiding an operator.

15. A system for vulnerability assessment of IoT devices, the system comprising a programmed processing unit adapted to carry out the method according to claim 1.

16. The system of claim 15, comprising at least one communication unit adapted to communicate with IoT devices through at least one wired communication medium and/or at least one communication unit adapted to communicate with IoT devices through at least one wireless communication medium.

17. The system of claim 15, comprising a software defined radio unit for scanning a predetermined frequency bandwidth and for wireless communicating with IoT devices.

18. The system of claim 15, comprising one or more vulnerability and/or penetration scan tools being preferably implemented as software programs to be executed by said programmed processing unit.

* * * * *